(12) United States Patent
Katsuyama et al.

(10) Patent No.: US 10,109,423 B2
(45) Date of Patent: Oct. 23, 2018

(54) ELECTRONIC COMPONENT AND MOUNTING STRUCTURE OF ELECTRONIC COMPONENT

(71) Applicant: Murata Manufacturing Co., Ltd., Nagaokakyo-shi, Kyoto-fu (JP)

(72) Inventors: Takanobu Katsuyama, Nagaokakyo (JP); Yasunari Nakamura, Nagaokakyo (JP); Naoto Muranishi, Nagaokakyo (JP); Takashi Sawada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/547,187

(22) Filed: Nov. 19, 2014

(65) Prior Publication Data

US 2015/0221441 A1    Aug. 6, 2015

(30) Foreign Application Priority Data

Jan. 31, 2014   (JP) ................................. 2014-016449

(51) Int. Cl.
*H01G 4/30* (2006.01)
*H01G 4/012* (2006.01)
*H01G 4/232* (2006.01)
*H01G 4/12* (2006.01)

(52) U.S. Cl.
CPC .............. *H01G 4/30* (2013.01); *H01G 4/012* (2013.01); *H01G 4/232* (2013.01); *H01G 4/12* (2013.01)

(58) Field of Classification Search
CPC ...................................................... H01G 4/30

USPC .................................. 361/303, 306.3, 301.4
See application file for complete search history.

(56) References Cited

U.S. PATENT DOCUMENTS

| 6,433,995 | B2* | 8/2002 | Nakagawa et al. ........... 361/311 |
| 6,563,689 | B2* | 5/2003 | Yamamoto ................. 361/306.1 |
| 7,023,688 | B2* | 4/2006 | Kazama ..................... 361/321.1 |
| 7,495,884 | B2* | 2/2009 | Togashi ..................... 361/306.3 |
| 7,589,953 | B2* | 9/2009 | Togashi et al. ............ 361/306.3 |
| 8,054,607 | B2* | 11/2011 | Lee et al. .................. 361/306.3 |
| 8,149,565 | B2* | 4/2012 | Lee et al. .................. 361/301.1 |
| 9,396,879 | B2* | 7/2016 | Ahn ....................... H01G 2/065 |
| 2005/0286205 | A1* | 12/2005 | Togashi et al. ............... 361/303 |
| 2006/0221547 | A1* | 10/2006 | Miura ................... H01G 4/008 361/305 |
| 2008/0186652 | A1* | 8/2008 | Lee et al. .................. 361/306.3 |
| 2008/0253059 | A1* | 10/2008 | Eggerding et al. ........ 361/301.4 |
| 2010/0149769 | A1 | 6/2010 | Lee et al. |

(Continued)

FOREIGN PATENT DOCUMENTS

JP    5229513 B2    7/2013

OTHER PUBLICATIONS

Ahn et al.—KR1020130129120—Priority document for US 2015/0114705—no date.*

(Continued)

*Primary Examiner* — Eric Thomas
(74) *Attorney, Agent, or Firm* — Keating & Bennett, LLP

(57) ABSTRACT

In an electronic component, each of a distance between a first outer electrode and a third outer electrode along a length direction and a distance between a second outer electrode and the third outer electrode along a length direction is about 8% to about 13% of a dimension of the electronic component along the length direction.

4 Claims, 8 Drawing Sheets

(56) References Cited

U.S. PATENT DOCUMENTS

| | | | |
|---|---|---|---|
| 2010/0284126 A1* | 11/2010 | Suzuki | C04B 35/468 361/321.4 |
| 2013/0050893 A1 | 2/2013 | Kim | |
| 2013/0050897 A1 | 2/2013 | Kim | |
| 2013/0050899 A1 | 2/2013 | Kim et al. | |
| 2013/0058006 A1 | 3/2013 | Kim | |
| 2015/0083477 A1* | 3/2015 | Lee | H01G 4/012 174/260 |
| 2015/0114705 A1* | 4/2015 | Ahn | H01G 4/005 174/260 |

OTHER PUBLICATIONS

Lee et al.—KR 1020130113129—Priority document for US 2015/0083477—no date.*

\* cited by examiner

ELECTRONIC COMPONENT AND MOUNTING STRUCTURE OF ELECTRONIC COMPONENT

BACKGROUND OF THE INVENTION

1. Field of the Invention

The present invention relates to an electronic component and a mounting structure of the electronic component.

2. Description of the Related Art

Electronic components, such as multilayer ceramic capacitors, are widely used. One example of a multilayer ceramic capacitor having a substantially rectangular parallelepiped shape is described in Japanese Patent No. 5229513. The multilayer ceramic capacitor described in Japanese Patent No. 5229513 includes a signal terminal electrode that covers a first end surface and reaches first and second principal surfaces and first and second side surfaces, a signal terminal electrode that covers a second end surface and reaches the first and second principal surfaces and the first and second side surfaces, and ground terminal electrodes disposed on the first and second principal surfaces, respectively. Japanese Patent No. 5229513 describes mounting the multilayer ceramic capacitor on a mounting substrate using a conductive material, such as solder.

Depending on the mode in which an electronic component is used, the electronic component is required to have a small equivalent series inductance (ESL).

SUMMARY OF THE INVENTION

Preferred embodiments of the present invention provide an electronic component with a small ESL.

According to a preferred embodiment of the present invention, an electronic component includes an electronic component body, a first inner electrode, a second inner electrode, a first outer electrode, a second outer electrode, and a third outer electrode. The electronic component body includes first and second principal surfaces extending along a length direction and a width direction, first and second side surfaces extending along the length direction and a thickness direction, and first and second end surfaces extending along the width direction and the thickness direction. The first inner electrode is an inner electrode disposed in the electronic component body along the length direction and the thickness direction. The first inner electrode includes a first extending portion extending to a first side portion of the second principal surface in the length direction and a second extending portion extending to a second side portion of the second principal surface in the length direction. The second inner electrode is an inner electrode disposed in the electronic component body along the length direction and the thickness direction and opposed to the first inner electrode in the width direction. The second inner electrode includes a third extending portion extending to a portion of the second principal surface, and the portion is located between the first extending portion and the second extending portion in the length direction. The first outer electrode is disposed on the second principal surface and covers the first extending portion. The second outer electrode is disposed on the second principal surface and covers the second extending portion. The third outer electrode is disposed on the second principal surface and covers the third extending portion. Each of a distance between the first outer electrode and the third outer electrode along the length direction and a distance between the second outer electrode and the third outer electrode along the length direction preferably is larger than or equal to about 8% and smaller than or equal to about 13% of a dimension of the electronic component along the length direction, for example.

According to a preferred embodiment of the present invention, an electronic component includes an electronic component body, a first inner electrode, a second inner electrode, a first outer electrode, a second outer electrode, and a third outer electrode. The electronic component body includes first and second principal surfaces extending along a length direction and a width direction, first and second side surfaces extending along the length direction and a thickness direction, and first and second end surfaces extending along the width direction and the thickness direction. The first inner electrode is an inner electrode disposed in the electronic component body along the length direction and the thickness direction. The first inner electrode includes a first extending portion extending to a first side portion of the second principal surface in the length direction and a second extending portion extending to a second side portion of the second principal surface in the length direction. The second inner electrode is an inner electrode disposed in the electronic component body along the length direction and the thickness direction and opposed to the first inner electrode in the width direction. The second inner electrode includes a third extending portion extending to a portion of the second principal surface, and the portion is located between the first extending portion and the second extending portion in the length direction. The first outer electrode is disposed on the second principal surface and covers the first extending portion. The second outer electrode is disposed on the second principal surface and covers the second extending portion. The third outer electrode is disposed on the second principal surface and covers the third extending portion. Each of a distance between the first outer electrode and the third outer electrode along the length direction and a distance between the second outer electrode and the third outer electrode along the length direction preferably is larger than or equal to about 8% and smaller than or equal to about 13% of a dimension of the electronic component along the length direction, for example. Each of a distance between the first extending portion and the third extending portion along the length direction and a distance between the second extending portion and the third extending portion along the length direction preferably is larger than or equal to about 18% and smaller than or equal to about 22% of the dimension of the electronic component along the length direction, for example.

According to a preferred embodiment of the present invention, an electronic component includes an electronic component body, a first inner electrode, a second inner electrode, a first outer electrode, a second outer electrode, and a third outer electrode. The electronic component body includes first and second principal surfaces extending along a length direction and a width direction, first and second side surfaces extending along the length direction and a thickness direction, and first and second end surfaces extending along the width direction and the thickness direction. The first inner electrode is an inner electrode disposed in the electronic component body along the length direction and the thickness direction. The first inner electrode includes a first extending portion extending to a first side portion of the second principal surface in the length direction and a second extending portion extending to a second side portion of the second principal surface in the length direction. The second inner electrode is an inner electrode disposed in the electronic component body along the length direction and the thickness direction and opposed to the first inner electrode in the width direction. The second inner electrode includes a third extending portion extending to a portion of the second principal surface, and the portion is located between the first extending portion and the second extending portion in the length direction. The first outer electrode is disposed on the second principal surface and covers the first extending portion. The second outer electrode is disposed on the second principal surface and covers the second extending portion. The third outer electrode is disposed on the second principal surface and covers the third extending portion. Each of a distance between the first outer electrode and the third outer electrode along the length direction and a distance between the second outer electrode and the third outer electrode along the length direction preferably is larger than or equal to about 8% and smaller than or equal to about 13% of a dimension of the electronic component along the length direction, for example. Each of a distance between the first extending portion and the third extending portion along the length direction and a distance between the second extending portion and the third extending portion along the length direction preferably is larger than or equal to about 18% and smaller than or equal to about 22% of the dimension of the electronic component along the length direction, for example. Each of a width of the first extending portion along the length direction and a width of the second extending portion along the length direction preferably is larger than or equal to about 8% and smaller than or equal to about 10% of the dimension of the electronic component along the length direction, and a width of the third extending portion along the length direction preferably is larger than or equal to about 19% and smaller than or equal to about 22% of the dimension of the electronic component along the length direction, for example.

According to various preferred embodiments of the present invention, electronic components with small ESL are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
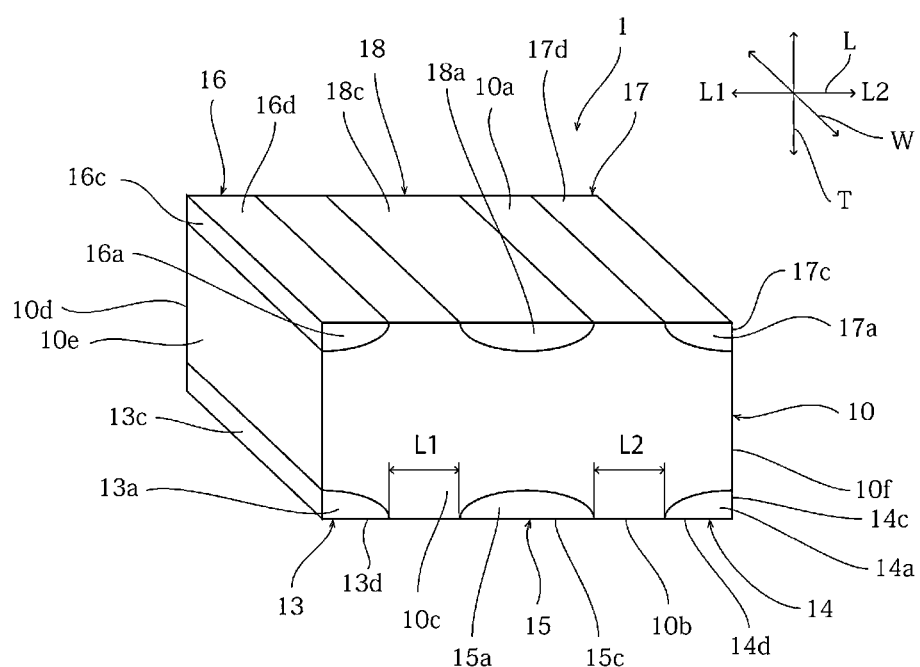
FIG. 1 is a schematic perspective view of an electronic component according to a preferred embodiment of the present invention.

Non-limiting examples of preferred embodiments of the present invention are described below. The preferred embodiments described below are merely illustrative examples. The present invention is not limited to the preferred embodiments described below.

In the drawings referred to in the description of preferred embodiments and the like, members having the same or virtually the same functions are referred to with the same reference numerals. The drawings referred to in the description of the preferred embodiments and the like are illustrated schematically. The ratios and the like between the dimensions of elements illustrated in the drawings may differ from the ratios between the real dimensions of the elements. The ratios and the like between the dimensions of the elements may differ among the drawings. Specific ratios and the like between the dimensions of the elements are to be determined in consideration of the description below.

Figure 2:
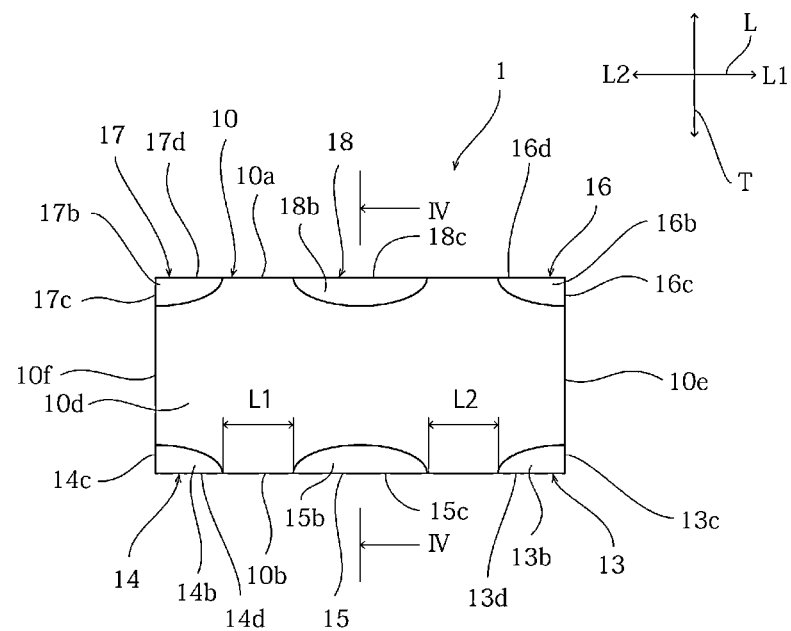
FIG. 2 is a schematic front view of a second side surface of the electronic component according to a preferred embodiment of the present invention.
Figure 3:
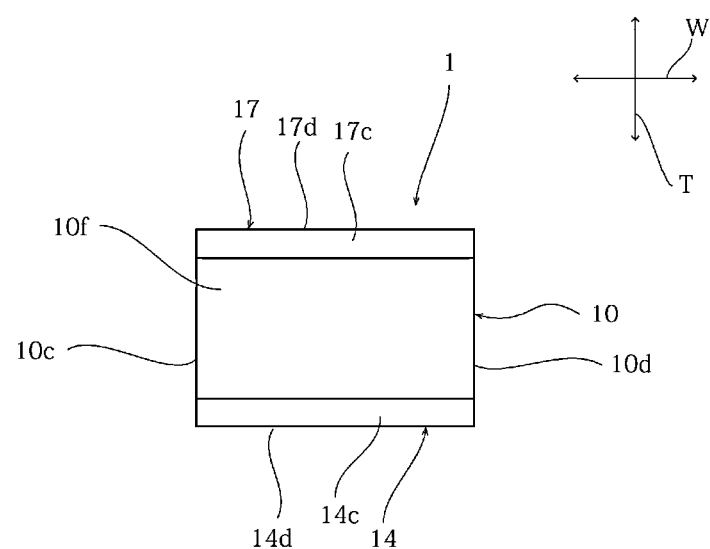
FIG. 3 is a schematic front view of a second end surface of the electronic component according to a preferred embodiment of the present invention.
Figure 4:
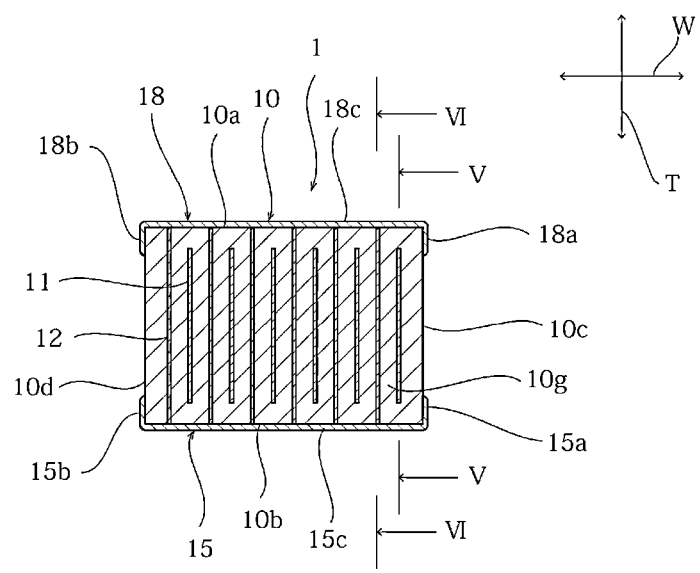
FIG. 4 is a schematic cross-sectional view taken along the line IV-IV in FIG. 2.
Figure 5:
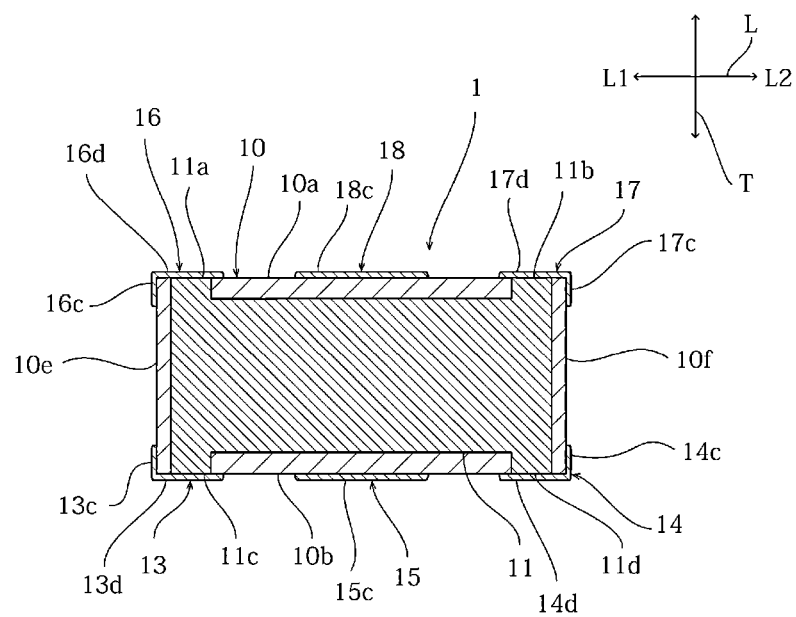
FIG. 5 is a schematic cross-sectional view taken along the line V-V in FIG. 4.
Figure 6:
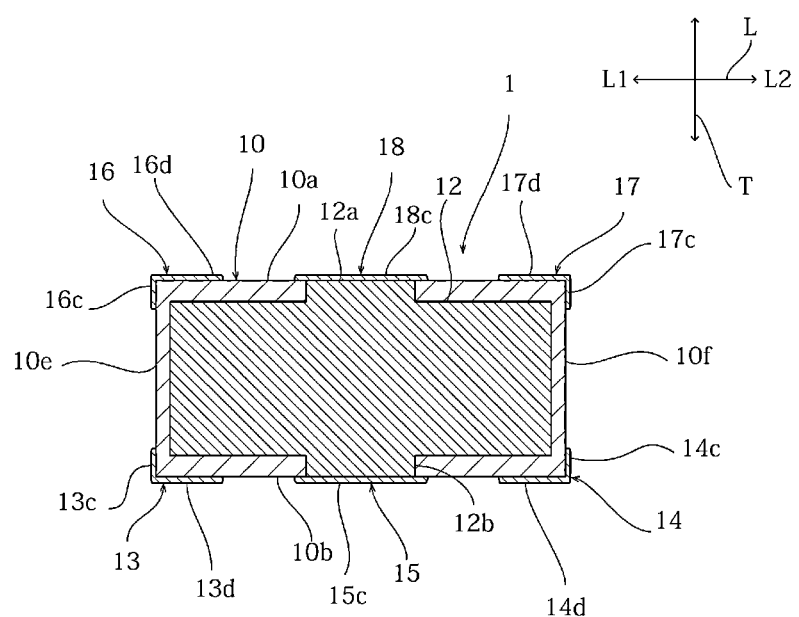
FIG. 6 is a schematic cross-sectional view taken along the line VI-VI in FIG. 4.

FIG. 1 is a schematic perspective view of an electronic component according to a preferred embodiment of the present invention. FIG. 2 is a schematic front view of a second side surface of the electronic component according to the present preferred embodiment. FIG. 3 is a schematic front view of a second end surface of the electronic component according to the present preferred embodiment. FIG. 4 is a schematic cross-sectional view taken along the line IV-IV in FIG. 2. FIG. 5 is a schematic cross-sectional view taken along the line V-V in FIG. 4. FIG. 6 is a schematic cross-sectional view taken along the line VI-VI in FIG. 4.

As illustrated in FIGS. 1 to 6, an electronic component 1 includes an electronic component body 10. The electronic component body 10 preferably has a substantially rectangular parallelepiped shape, for example. The corners and ridges of the electronic component body 10 may be chamfered or rounded. Each of the principal surfaces, side surfaces, and end surfaces may have non-flat shapes.

The electronic component body 10 includes first and second principal surfaces 10a and 10b, first and second side surfaces 10c and 10d, and first and second end surfaces 10e and 10f. Each of the first and second principal surfaces 10a and 10b extends along a width direction W and a length direction L. Each of the first and second side surfaces 10c and 10d extends along the width direction W and a thickness direction T. Each of the first and second end surfaces 10e and 10f extends along the length direction L and thickness direction T. The length direction L is substantially perpendicular to the width direction W. The thickness direction T is substantially perpendicular to each of the length direction L and width direction W.

Among the first and second principal surfaces 10a and 10b, first and second side surfaces 10c and 10d, and first and second end surfaces 10e and 10f, the first and second principal surfaces 10a and 10b are the largest, and the first and second end surfaces 10e and 10f are the smallest.

The dimensions of the electronic component body 10 are not particularly limited. For example, the thickness dimension of the electronic component body 10 may preferably be about 0.8 mm to about 1.0 mm, the length dimension thereof may preferably be about 1.9 mm to about 2.1 mm, and the width dimension thereof may preferably be about 1.15 mm to about 1.35 mm.

The electronic component body 10 may be made of an appropriate ceramic material, for example, in accordance with the functions of the electronic component 1. Specifically, when the electronic component 1 is a capacitor, the electronic component body 10 can be made of a ceramic dielectric material. Examples of the ceramic dielectric material may include barium titanate ($BaTiO_3$), calcium titanate ($CaTiO_3$), strontium titanate ($SrTiO_3$), and calcium zirconate ($CaZrO_3$). Depending on the characteristics required for the electronic component 1, an accessory ingredient may be added to the electronic component body 10. Examples of such an accessory ingredient may include a manganese compound, magnesium compound, silicon compound, iron compound, chromium compound, cobalt compound, nickel compound, and rare-earth compound.

When the electronic component 1 is an inductor, for example, the electronic component body 10 can be made of a ceramic magnetic material. One specific example of the ceramic magnetic material may be a ceramic ferrite material.

As illustrated in FIG. 4, a plurality of first inner electrodes 11 and a plurality of second inner electrodes 12 are disposed in the electronic component body 10. Each of the first inner electrodes 11 and the second inner electrodes 12 extends along the length direction L and thickness direction T. The first inner electrodes 11 and the second inner electrodes 12 are alternately arranged and spaced apart from each other along the width direction W. The neighboring first and second inner electrodes 11 and 12 are opposed to each other in the width direction W such that a ceramic portion 10g is disposed therebetween.

As illustrated in FIG. 5, the first inner electrodes 11 extend to the first and second principal surfaces 10a and 10b. Specifically, each of the first inner electrodes 11 includes first to fourth extending portions 11a to 11d. The first extending portion 11a extends to an L1-side portion of the first principal surface 10a in the length direction L. The second extending portion 11b extends to an L2-side portion of the first principal surface 10a in the length direction L. The third extending portion 11c extends to an L1-side portion of the second principal surface 10b in the length direction L. The fourth extending portion 11d extends to an L2-side portion of the second principal surface 10b in the length direction L. The first inner electrode 11 is separated from the first and second end surfaces 10e and 10f. That is, the first inner electrode 11 extends to neither the first end surface 10e nor the second end surface 10f.

As illustrated in FIG. 6, the second inner electrodes 12 extend to the first and second principal surfaces 10a and 10b. Specifically, each of the second inner electrodes 12 includes first and second extending portions 12a and 12b. The first extending portion 12a extends to a substantially central portion of the first principal surface 10a in the length direction L. The second extending portion 12b extends to a substantially central portion of the second principal surface 10b in the length direction L. The first and second extending portions 12a and 12b are opposed to none of the first to fourth extending portions 11a to 11d in the width direction W. The second inner electrode 12 is separated from the first and second end surfaces 10e and 10f. That is, the second inner electrode 12 extends to neither the first end surface 10e nor the second end surface 10f.

Each of the first and second inner electrodes 11 and can be made of a metal, such as nickel, copper, silver, palladium, gold, or an alloy of silver and palladium, for example.

As illustrated in FIGS. 1, 2, 5, and 6, first and second terminal electrodes 13 and 14 and a third terminal electrode 15 are disposed on the second principal surface 10b.

As illustrated in FIG. 1, the first terminal electrode 13 is disposed on a portion of the second principal surface 10b that is near the first end surface 10e (on the L1 side) in the length direction L. The first terminal electrode 13 extends between a first side end portion and a second side end portion of the second principal surface 10b along the width direction W. The first terminal electrode 13 is disposed on the second principal surface 10b and on at least one of the first and second side surfaces 10c and 10d and the first and second end surfaces 10e and 10f so as to extend across the boundary therebetween. Specifically, in the present preferred embodiment, the first terminal electrode 13 is disposed on the second principal surface 10b and on each of the first and second side surfaces 10c and 10d and the first end surface 10e so as to extend across the boundaries therebetween. The first terminal electrode 13 includes a portion 13d on the second principal surface 10b, a portion 13a on the first side surface 10c, a portion 13b on the second side surface 10d, and a portion 13c on the first end surface 10e. The first terminal electrode 13 does not reach the first principal surface 10a. That is, the portions 13a to 13c do not reach the first principal surface 10a. The length of the portions 13a to 13c along the thickness direction T preferably is less than about one-half, and preferably, smaller than or equal to about one-third of the length of the electronic component body 10 along the thickness direction T.

As illustrated in FIG. 5, the first terminal electrode is connected to the first inner electrode 11. The first terminal electrode 13 covers the third extending portion 11c in the first inner electrode 11.

The first terminal electrode 13 may be disposed only on the second principal surface 10b, for example.

As illustrated in FIG. 1, the second terminal electrode 14 is disposed on a portion of the second principal surface 10b that is near the second end surface 10f (on the L2 side) in the length direction L. The second terminal electrode 14 extends between a first side end portion and a second side end portion of the second principal surface 10b along the width direction W. The second terminal electrode 14 is disposed on the second principal surface 10b and on at least one of the first and second side surfaces 10c and 10d and the first and second end surfaces 10e and 10f so as to extend across the boundary therebetween. Specifically, in the present preferred embodiment, the second terminal electrode 14 is disposed on the second principal surface 10b and on each of the first and second side surfaces 10c and 10d and the second end surface 10f so as to extend across the boundaries therebetween. The second terminal electrode 14 includes a portion 14d on the second principal surface 10b, a portion 14a on the first side surface 10c, a portion 14b on the second side surface 10d, and a portion 14c on the second end surface 10f. The second terminal electrode 14 does not reach the first principal surface 10a. That is, the portions 14a to 14c do not reach the first principal surface 10a. The length of the portions 14a to 14c along the thickness direction T preferably is less than about one-half, and preferably, smaller than or equal to about one-third of the length of the electronic component body 10 along the thickness direction T.

As illustrated in FIG. 5, the second terminal electrode 14 is connected to the first inner electrode 11. The second terminal electrode 14 covers the fourth extending portion 11d in the first inner electrode 11.

The second terminal electrode 14 may be disposed only on the second principal surface 10b.

As illustrated in FIG. 1, the third terminal electrode 15 is disposed on a portion of the second principal surface 10b that is located between the first and second terminal electrodes 13 and 14 in the length direction L. The third terminal electrode 15 extends between a first side end portion and a second side end portion of the second principal surface 10b along the width direction W. The third terminal electrode 15 is separated from the first and second terminal electrodes 13 and 14. The third terminal electrode 15 is disposed on the second principal surface 10b and on at least one of the first and second side surfaces 10c and 10d so as to extend across the boundary therebetween. Specifically, in the present preferred embodiment, the third terminal electrode 15 is disposed on the second principal surface 10b and on each of the first and second side surfaces 10c and 10d so as to extend across the boundaries therebetween. The third terminal electrode 15 includes a portion 15c on the second principal surface 10b, a portion 15a on the first side surface 10c, and a portion 15b on the second side surface 10d. The third terminal electrode 15 does not reach the first principal surface 10a. That is, the length of the portions 15a and 15b along the thickness direction T preferably is less than about one-half, and preferably, smaller than or equal to about one-third of the length of the electronic component body 10 along the thickness direction T.

As illustrated in FIG. 6, the third terminal electrode is connected to the second inner electrode 12. The third terminal electrode 15 covers the second extending portion 12b in the second inner electrode 12.

The third terminal electrode 15 may be disposed only on the second principal surface 10b.

Fourth and fifth terminal electrodes 16 and 17 and a sixth terminal electrode 18 are disposed on the first principal surface 10a.

As illustrated in FIG. 1, the fourth terminal electrode 16 is disposed on a portion of the first principal surface 10a that is near the first end surface 10e (on the L1 side) in the length direction L. The fourth terminal electrode 16 extends between a first end portion and a second end portion of the first principal surface 10a along the width direction W. The fourth terminal electrode 16 is disposed on the first principal surface 10a and on at least one of the first and second side surfaces 10c and 10d and the first and second end surfaces 10e and 10f so as to extend across the boundary therebetween. Specifically, in the present preferred embodiment, the fourth terminal electrode 16 is disposed on the first principal surface 10a and on each of the first and second side surfaces 10c and 10d and the first end surface 10e so as to extend across the boundaries therebetween. The fourth terminal electrode 16 includes a portion 16d on the first principal surface 10a, a portion 16a on the first side surface 10c, a portion 16b on the second side surface 10d, and a portion 16c on the first end surface 10e. The fourth terminal electrode 16 does not reach the second principal surface 10b. That is, the portions 16a to 16c do not reach the second principal surface 10b. The length of the portions 16a to 16c along the thickness direction T preferably is less than about one-half, and preferably, smaller than or equal to about one-third of the length of the electronic component body 10 along the thickness direction T.

As illustrated in FIG. 5, the fourth terminal electrode 16 is connected to the first inner electrode 11. The fourth terminal electrode 16 covers the first extending portion 11a in the first inner electrode 11.

The fourth terminal electrode 16 may be disposed only on the first principal surface 10a.

The fifth terminal electrode 17 is disposed on a portion of the first principal surface 10a that is near the second end surface 10f (on the L2 side) in the length direction L. The fifth terminal electrode 17 extends between a first end portion and a second end portion of the second principal surface 10b along the width direction W. The fifth terminal electrode is disposed on the first principal surface 10a and on at least one of the first and second side surfaces 10c and 10d and the first and second end surfaces 10e and 10f so as to extend across the boundary therebetween. Specifically, in the present preferred embodiment, the fifth terminal electrode 17 is disposed on the first principal surface 10a and on each of the first and second side surfaces 10c and 10d and the second end surface 10f so as to extend across the boundaries therebetween. The fifth terminal electrode 17 includes a portion 17d on the first principal surface 10a, a portion 17a on the first side surface 10c, a portion 17b on the second side surface 10d, and a portion 17c on the second end surface 10f. The fifth terminal electrode 17 does not reach the second principal surface 10b. That is, the portions 17a to 17c do not reach the second principal surface 10b. The length of the portions 17a to 17c along the thickness direction T preferably is less than about one-half, and preferably, smaller than or equal to about one-third of the length of the electronic component body 10 along the thickness direction T.

As illustrated in FIG. 5, the fifth terminal electrode is connected to the first inner electrode 11. The fifth terminal electrode 17 covers the second extending portion 11b in the first inner electrode 11.

The fifth terminal electrode 17 may be disposed only on the first principal surface 10a.

As illustrated in FIG. 1, the sixth terminal electrode 18 is disposed on a portion of the first principal surface 10a that is located between the fourth and fifth terminal electrodes 16 and 17 in the length direction L. The sixth terminal electrode 18 extends between a first side end portion and a second side end portion of the first principal surface 10a along the width direction W. The sixth terminal electrode 18 is separated from the fourth and fifth terminal electrodes 16 and 17. The sixth terminal electrode 18 is disposed on the first principal surface 10a and on at least one of the first and second side surfaces 10c and 10d so as to extend across the boundary therebetween. Specifically, in the present preferred embodiment, the sixth terminal electrode 18 is disposed on the first principal surface 10a and on each of the first and second side surfaces 10c and 10d so as to extend across the boundaries therebetween. The sixth terminal electrode 18 includes a portion 18c on the first principal surface 10a, a portion 18a on the first side surface 10c, and a portion 18b on the second side surface 10d. The sixth terminal electrode 18 does not reach the second principal surface 10b. That is, the length of the portions 18a and 18b along the thickness direction T preferably is less than one-half, and preferably, smaller than or equal to one-third of the length of the electronic component body 10 along the thickness direction T.

As illustrated in FIG. 6, the sixth terminal electrode is connected to the second inner electrode 12. The sixth terminal electrode 18 covers the first extending portion 12a in the second inner electrode 12.

The sixth terminal electrode 18 may be disposed only on the first principal surface 10a.

Each of the first, second, fourth, and fifth terminal electrodes 13, 14, 16, and 17 and the third and sixth terminal electrodes 15 and 18 can be made of an appropriate metal, such as nickel, copper, silver, palladium, gold, tin, chromium, or an alloy of silver and palladium, for example.

Each of the first, second, fourth, and fifth terminal electrodes 13, 14, 16, and 17 and the third and sixth terminal electrodes 15 and 18 may contain a baked electrode layer formed by baking of a conductive paste layer. Each of the first, second, fourth, and fifth terminal electrodes 13, 14, 16, and 17 and the third and sixth terminal electrodes 15 and 18 may include, for example, at least one baked electrode layer on the electronic component body 10 and at least one plating layer on the baked electrode layer.

The first terminal electrode 13 and the fourth terminal electrode 16 may be physically and electrically connected to each other by electrode material so as to constitute one continuous electrode. The second terminal electrode 14 and the fifth terminal electrode 17 may be physically and electrically connected to each other by electrode material so as to constitute one continuous electrode. The third terminal electrode 15 and the sixth terminal electrode 18 may be physically and electrically connected to each other by electrode material so as to constitute one continuous electrode.

Figure 7:
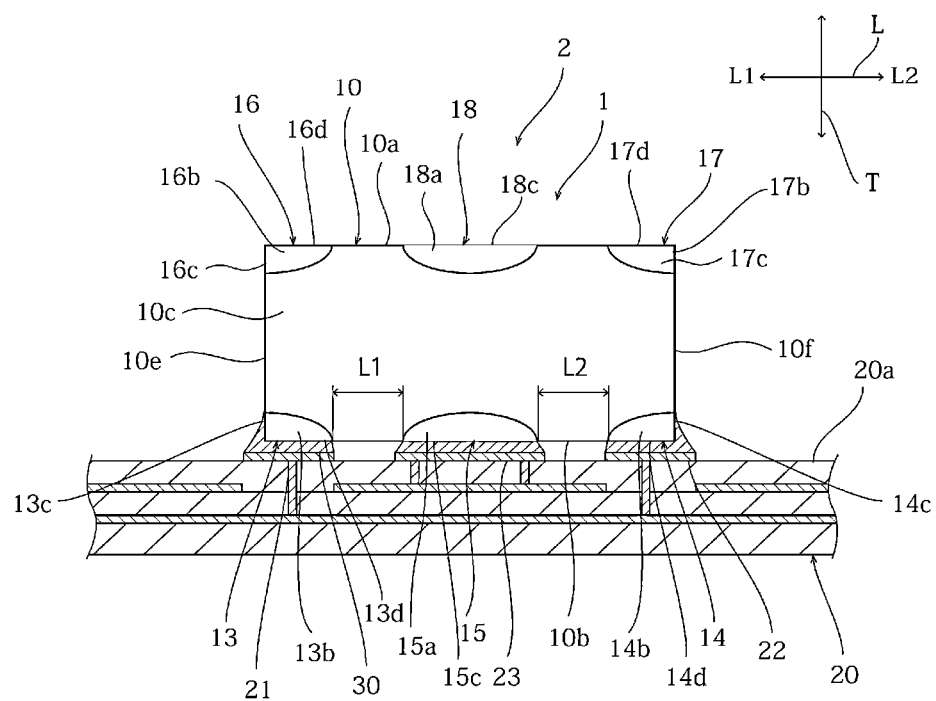
FIG. 7 is a schematic cross-sectional view of a mounting structure of the electronic component according to a preferred embodiment of the present invention.

FIG. 7 is a schematic cross-sectional view of a mounting structure the electronic component according to the present preferred embodiment. A mounting structure 2 for an electronic component includes the electronic component 1 and a mounting substrate 20. The electronic component 1 is mounted on a mounting surface 20a of the mounting substrate 20. The mounting substrate 20 includes first to third lands 21 to 23 on the mounting surface 20a.

The first land 21 is electrically connected to the first terminal electrode 13. The first land 21 reaches an outer side portion (on the L1 side) in the length direction L with respect to the first terminal electrode 13. That is, the first land 21 includes a portion located outside the electronic component 1 in plan view (as seen from the thickness direction T).

The second land 22 is electrically connected to the second terminal electrode 14. The second land 22 reaches an outer side portion (on the L2 side) in the length direction L with respect to the second terminal electrode 14. That is, the second land 22 includes a portion located outside the electronic component 1 in plan view (as seen from the thickness direction T).

The third land 23 is electrically connected to the third terminal electrode 15.

The lands 21 to 23 are joined and electrically to the terminal electrodes 13 to 15, respectively, using a conductive material 30. Specifically, the conductive material 30 joins and electrically connects the land 21 to the portion 13d on the second principal surface 10b and the other portions 13a, 13b, and 13c in the first terminal electrode 13. The conductive material 30 joins and electrically connects the land 22 to the portion 14d on the second principal surface 10b and the other portions 14a, 14b, and 14c in the second terminal electrode 14. The conductive material 30 joins and electrically connects the land 23 to at least the portion 15c on the second principal surface 10b and the other portions 15a and 15b.

The lands 21 to 23 may be joined to only the portions 13d, 14d, and 15c using the conductive material 30. In that case, however, the joining strength may be low. Accordingly, it may be preferred that, in addition to the portions 13d, 14d, and 15c in the terminal electrodes 13 to 15, the other portions preferably are joined to the lands 21 to 23 using the conductive material 30.

The conductive material 30 is not particularly limited and may be any conductive material. The conductive material 30 can be made of, for example, solder.

In the present preferred embodiment, each of a distance L1 between the first terminal electrode (first outer electrode) 13 and the third terminal electrode (third outer electrode) 15 along the length direction and a distance L2 between the second terminal electrode (second outer electrode) 14 and the third terminal electrode (third outer electrode) 15 along the length direction preferably is larger than or equal to about 8% and less than about 13% of the dimension of the electronic component 1 along the length direction L, for example. Accordingly, because the distance through which a signal passes between the first and third terminal electrodes and the distance between the second and third terminal electrodes are reduced, the ESL is significantly reduced.

Figure 8:
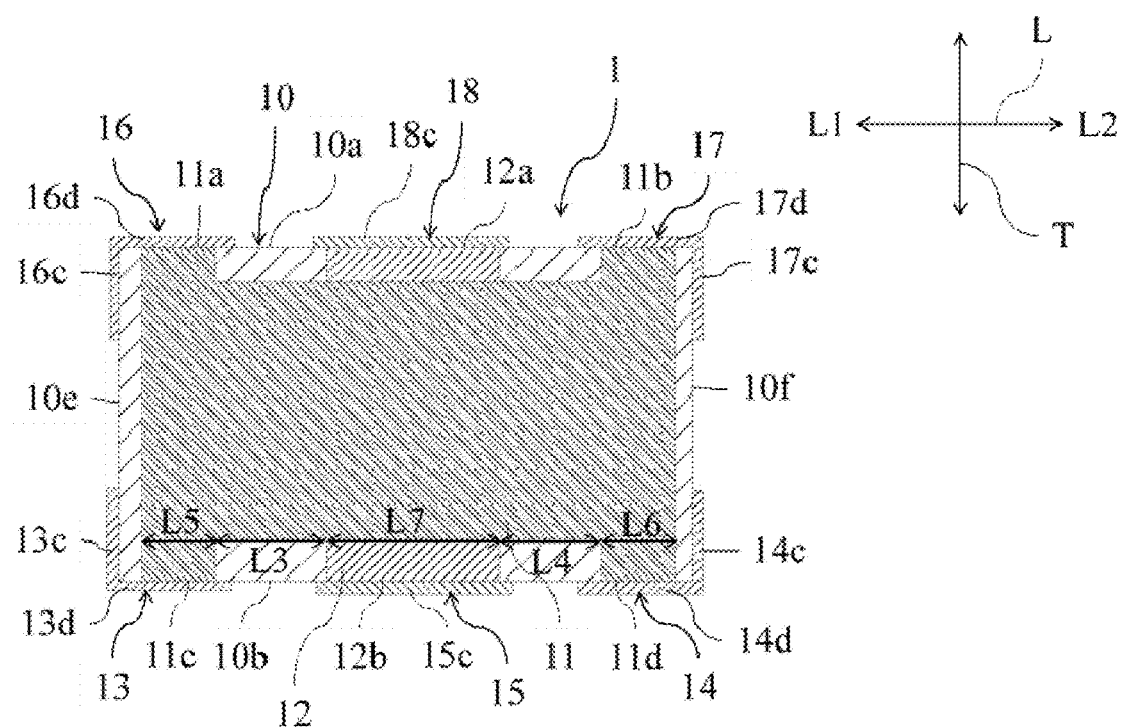
FIG. 8 includes schematic cross-sectional views of the structure mounting of the electronic component according to a preferred embodiment of the present invention.

In the present preferred embodiment, each of a distance L3 between the third extending portion 11c in the first inner electrode 11 and the second extending portion 12b in the second inner electrode 12 along the length direction L and a distance L4 between the fourth extending portion 11d in the first inner electrode 11 and the second extending portion 12b in the second inner electrode 12 along the length direction L illustrated in FIG. 8 preferably is larger than or equal to about 18% and less than about 22% of the dimension of the electronic component 1 along the length direction L, for example. Accordingly, because the distance through which a signal passes between the first and third terminal electrodes and the distance between the second and third terminal electrodes are reduced, the ESL is significantly reduced.

In the present preferred embodiment, each of a width L5 of the third extending portion 11c in the first inner electrode 11 along the length direction L and a width L6 of the fourth extending portion 11d along the length direction L illustrated in FIG. 8 preferably is larger than or equal to about 8% and smaller than or equal to about 10% of the dimension of the electronic component 1 along the length direction L, and a width L7 of the second extending portion 12b in the second inner electrode 12 along the length direction L is larger than or equal to about 19% and less than about 22% of the dimension of the electronic component 1 along the length direction L, for example. Accordingly, because the distance through which a signal passes between the first and third terminal electrodes and the distance between the second and third terminal electrodes are reduced, the ESL is significantly reduced.

The distance L1 between the first terminal electrode (first outer electrode) 13 and the third terminal electrode (third outer electrode) 15 along the length direction, the distance L2 between the second terminal electrode (second outer electrode) 14 and the third terminal electrode (third outer electrode) 15 along the length direction, the distance L3 between the third extending portion 11c in the first inner electrode 11 and the second extending portion 12b in the second inner electrode 12 along the length direction L, the distance L4 between the fourth extending portion 11d in the first inner electrode 11 and the second extending portion 12b in the second inner electrode 12 along the length direction L, the width L5 of the third extending portion 11c in the first inner electrode 11 along the length direction L, the width L6 of the fourth extending portion 11d along the length direction L, and the width L7 of the second extending portion 12b in the second inner electrode 12 along the length direction L can be measured by polishing the first side surface 10c or second side surface 10d, exposing both the first inner electrode 11 and the second inner electrode 12 to form exposed surfaces, and obtaining projected images of the exposed surfaces using an Nikon measuring microscope MM-60 with a magnification of 20×.

Each of the distances L1 and L2 is a distance in a substantially central portion in the length direction L of the second main surface 10b or the first side surface 10c.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
an electronic component body;
a first inner electrode;
a second inner electrode;
a first outer electrode;
a second outer electrode; and
a third outer electrode; wherein
the electronic component body includes first and second principal surfaces extending along a length direction and a width direction, first and second side surfaces extending along the length direction and a thickness direction, and first and second end surfaces extending along the width direction and the thickness direction;
the first inner electrode is an inner electrode disposed in the electronic component body along the length direction and the thickness direction, the first inner electrode includes a first extending portion extending to a first side portion of the second principal surface in the length direction and a second extending portion extending to a second side portion of the second principal surface in the length direction;
the second inner electrode is an inner electrode disposed in the electronic component body along the length direction and the thickness direction and opposed to the first inner electrode in the width direction, the second inner electrode includes a third extending portion extending to a portion of the second principal surface, the portion is located between the first extending portion and the second extending portion in the length direction;
the first outer electrode is disposed on the second principal surface and is connected to the first extending portion;
the second outer electrode is disposed on the second principal surface and is connected to the second extending portion;
the third outer electrode is disposed on the second principal surface and is connected to the third extending portion;
each of a distance between the first outer electrode and the third outer electrode along the length direction and a distance between the second outer electrode and the third outer electrode along the length direction is larger than or equal to about 8% and smaller than or equal to about 13% of a dimension of the electronic component along the length direction;
each of a distance between the first extending portion and the third extending portion along the length direction and a distance between the second extending portion and the third extending portion along the length direction is larger than or equal to about 18% and smaller than or equal to about 22% of the dimension of the electronic component along the length direction;
each of a width of the first extending portion along the length direction and a width of the second extending portion along the length direction is larger than or equal to about 8% and smaller than or equal to about 10% of the dimension of the electronic component along the length direction, and a width of the third extending portion along the length direction is larger than or equal to about 19% and smaller than or equal to about 22% of the dimension of the electronic component along the length direction;
the dimension of the electronic component along the length direction is about 1.9 mm to about 2.1 mm;
the first outer electrode extends from the second principal surface to the first and second side surfaces and the first end surface;
the second outer electrode extends from the second principal surface to the first and second side surfaces and the second end surface; and
the first inner electrode is separated from both of the first and second end surfaces and is not connected to portions of the first and second outer electrodes at the first and second end surfaces.

2. The electronic component according to claim 1, wherein
the first outer electrode does not extend to the first principal surface; and
the second outer electrode does not extend to the first principal surface.

3. The electronic component according to claim 2, wherein
each dimension of the first outer electrode on the first and second side surfaces and the first end surface along the thickness direction is less than or equal to about one-third of a dimension of the electronic component body along the thickness direction;
each dimension of the second outer electrode on the first and second side surfaces and the second end surface along the thickness direction is less than or equal to about one-third of a dimension of the electronic component body along the thickness direction; and
each dimension of the third outer electrode on the first and second side surfaces along the thickness direction is less than or equal to about one-third of a dimension of the electronic component body along the thickness direction.

4. The electronic component according to claim 3, wherein areas of the first and second side surfaces are smaller than areas of the first and second end surfaces.

* * * * *